United States Patent [19]

Golder et al.

[11] Patent Number: 5,032,631

[45] Date of Patent: Jul. 16, 1991

[54] UV-LIGHT STABILIZED POLYESTER MOLDING COMPOSITIONS

[75] Inventors: Michael D. Golder, Allendale, N.J.; Bruce M. Mulholland, Union, Ky.

[73] Assignee: Hoechst Celanese Corporation, Somerville, N.J.

[21] Appl. No.: 269,401

[22] Filed: Nov. 10, 1988

[51] Int. Cl.$^5$ .................. C08K 5/3492; C08K 5/05; C08K 5/06

[52] U.S. Cl. .................................. 524/101; 524/110; 524/336

[58] Field of Search ................ 524/101, 110, 336

[56] References Cited

U.S. PATENT DOCUMENTS

| | | | |
|---|---|---|---|
| 3,651,014 | 3/1972 | Witsiepe | 528/309 |
| 3,864,428 | 2/1975 | Nakamura et al. | 525/67 |
| 3,907,926 | 9/1975 | Brown et al. | 524/257 |
| 4,034,013 | 7/1977 | Lane | 524/513 |
| 4,096,202 | 6/1978 | Farnham et al. | 525/64 |
| 4,136,090 | 1/1979 | Hoeschele | 528/289 |
| 4,169,089 | 9/1979 | Minagawa et al. | 260/45.95 |
| 4,185,003 | 1/1980 | Hoeschele | 524/102 |
| 4,250,280 | 2/1981 | Tanaka et al. | 525/437 |
| 4,340,718 | 7/1982 | Zannucci et al. | 528/128 |
| 4,355,155 | 10/1982 | Nelsen | 528/301 |
| 4,385,143 | 5/1983 | Yachigo et al. | 524/101 |
| 4,405,749 | 9/1983 | Nelsen | 524/100 |
| 4,469,851 | 9/1984 | Charles et al. | 525/444 |
| 4,863,982 | 9/1989 | Stegmann et al. | 524/101 |

FOREIGN PATENT DOCUMENTS

| | | |
|---|---|---|
| 0048841 | 4/1981 | European Pat. Off. . |
| 0246190 | 6/1987 | European Pat. Off. . |
| 75-91652 | 12/1973 | Japan . |
| 2009768A | 6/1979 | United Kingdom . |

OTHER PUBLICATIONS

Hytrel ® Polyester Elastomer Technical Notes, DuPont Company, (Mar. 2, 1977).

Plastics Additives Technical Bulletin D-48, American Cyanamid Company, (Aug., 1985).

Encyclopedia of Polymer Science and Technology, vol. 14, p. 132, (1972).

*Primary Examiner*—Kriellion Morgan
*Attorney, Agent, or Firm*—Nixon & Vanderhyde

[57] ABSTRACT

Polyester molding compositions include an effective amount of a triazine-based antioxidant and a benzophenone ultraviolet light absorber sufficient to achieve a clor difference, as calculated in CIELab units under illuminant "D-65" according to ASTM Standard D-2244, of less than about 10,0, when exposed in a Xenon arc weather-ometer operated according to SAE J1885 for 315 Kj/sq.m. The triazine-based antioxidant is of the formula:

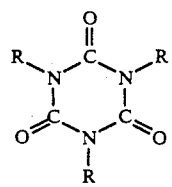

wherein R is a phenolic group attached to the triazine ring via a C1 to C5 alkyl or an ester substituent. Preferably, the triazine-based antioxidant is 3,5-di-tert-butyl-4-hydroxyhydrocinnamic acid triester with 1,3,5-tris-(2-hydroxyethyl)-s-triazine-2,4,6-(1H, 3H, 5H) trione. The benzophenone UV-absorber is of the general formula:

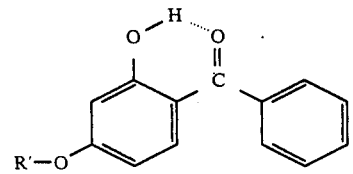

where R' is hydrogen or an alkyl radical.

7 Claims, No Drawings

UV-LIGHT STABILIZED POLYESTER MOLDING COMPOSITIONS

FIELD OF THE INVENTION

This invention relates generally to polyester molding compositions. More particularly, the invention relates to polyester molding compositions which are stabilized against the degradative effects of ultraviolet light. In preferred embodiments, the invention includes a polyester resin blended with a triazine-based antioxidant and a benzophenone UV-light absorber.

BACKGROUND AND SUMMARY OF THE INVENTION

Polyester resins (e.g., copolyester elastomers, polyalkylene terephthalates, and the like) are known to degrade when exposed to ultraviolet light. The degradative effects of ultraviolet light on polyester resins is typically evidenced by a distinct color change in the resin. That is, when exposed to ultraviolet light, the color of polyester resins usually changes from a white appearance to a grey or yellow appearance after time. Moreover, this color change usually occurs rapidly with the rate of color change in response to exposure to ultraviolet light thereafter decreasing over time.

Recently, polyester resins (particularly polyester elastomers and polyester resins blended with impact modifiers) have been used in automotive applications, i.e., as molded parts on the interior and/or exterior of an automobile. Needless to say, any color change of the original molded polyester resin is unacceptable when used as a part for an automobile, particularly a part that is visible. To counteract the tendency of polyester resins to degrade upon exposure to ultraviolet light, a variety of UV-light stabilization systems have been proposed.

In U.S. Pat. No. 4,185,003, for example, thermoplastic copolyetherester elastomers are stabilized against heat and light aging by incorporating into the copolyetherester an effective concentration of a phenolic antioxidant and a hindered amine photostabilizer. Japanese patent Publication No. 75/91652 discloses the use of a number of hindered piperidine type photostabilizers in combination with phenolic antioxidants in copolyetheresters. However, according to U.S. Pat. No. 4,185,003, while improvements to photostabilization of the copolyetheresters is improved when the teaching of this Japanese Publication is followed, the heat-aging behavior is much poorer when the photostabilizer is present compared to performance in the absence of the photostabilizer (see, column 1, lines 30-45 of U.S. Pat. No. 4,185,003).

U.S. Pat. No. 4,136,090 suggests that copolyetheresters may be stabilized against oxidative degradation due to exposure to heat and light by incorporating into the polymer an effective concentration of a phenolic antioxidant and copolymerized hindered amine photostabilizer.

In U.S. Pat. No. 4,340,718, polyester materials, particularly copolyesters, are rendered less susceptible to weathering by incorporating into the polyester resin a dimethyl and diethyl ester of p-methoxybenzylidenemalonic acid having monofunctional terminal ester forming groups or a difunctional comonomer.

U.S. Pat. Nos. 4,355,155 and 4,405,749 each disclose segmented thermoplastic copolyester elastomers which may be stabilized against heat. For example, in U.S. Pat. No. 4,355,155 such stabilizers may include phenols and their derivatives, amines and their derivatives, compounds containing both hydroxyl and amine groups, hydroxyazines, oximes, polymeric phenolic esters and salts of multivalent metals in which the metal is in its lower state (see column 3, lines 46-52), while in U.S. Pat. No. 4,405,749, a particular triazine-based anti-oxidant (i.e., 3,5-di-tert-butyl-4- hydroxyhydrocinnamic acid triester with 1,3,5-tris-(2-hydroxyethyl)-s-triazine-2,4,6-(1H, 3H, 5H) trione) is disclosed as having superior thermal stability. Each of the compositions of these prior issued U.S. patents moreover mention that additional stabilization against ultraviolet light may be obtained by compounding the copolyetheresters with various UV absorbers, such as substituted benzophenones or benzotriazoles (see, column 4, lines 1-3 of U.S. Pat. No. 4,355,155; and column 4, lines 10-13 of U.S. Pat. No. 4,405,749).

Blends of polybutylene terephthalate and a segmented thermoplastic copolyester elastomer may also be stabilized against heat or ultraviolet light via the addition of various stabilizers. For example, in U.S. Pat. No. 3,907,926, antioxidants and amide stabilizers may be incorporated into the PBT/polyester elastomer blends (see column 6, line 55 bridging column 7, line 25), while U.S. Pat. No. 4,469,851 suggests the phenol derivatives (including 3,5-di-tert-butyl-4- hydroxyhydrocinnamic acid triester with 1,3,5-tris-(2-hydroxyethyl)-s-triazine-2,4,6-(1H, 3H, 5H) trione) may be incorporated into the PBT/polyester elastomer blends for UV-light stabilization functions.

A three-way stabilization system for polyester elastomers is also known (see DuPont Elastomers Laboratory Technical Notes for Hytrel® polyester elastomer, Mar. 2, 1977). In essence this three-way system consists of equal parts of a phenolic antioxidant (tetrakis (methylene-3-(3,5-di-tert- butyl-4-hydroxy-phenyl propionate) methane), a benzotriazole absorber (i.e., 2-3(3',5'-di-t-butyl-2'-hydroxyphenyl)-5-chlorobenzotriazole) and a hindered piperdine type compound (i.e., bis(2,2,6,6-tetramethyl-4-piperidinyl)sebacate). The presence of the latter piperdine type compound is, however, suggested to be an indispensable component.

Surprisingly, by employing the additives as will be described below, polyester molding compositions are rendered resistant to weathering, and more particularly, are rendered resistant to degradation by UV light.

Broadly, the present invention is based upon the unexpected discovery that when certain triazine-based antioxidants and benzophenone UV-absorbers are incorporated into polyester molding compositions, synergistic effects in terms of UV-light stabilization properties of the resulting resins ensue. In particular, it has been found that when the triazine-based antioxidants and benzophenones (to be described in greater detail below) are incorporated into polyester resins, the color difference of the resin when exposed to ultraviolet light is significantly lower as compared to other known UV-light stabilized polyester resins commercially available and other known UV-light stabilization systems. For example, it has been found that the polyester resin compositions of this invention exhibit a desirably low color difference, as calculated in CIELab units under illuminant "D-65" according to ASTM Standard D-2244, of less than about 10.0, when samples are exposed in a Xenon arc weather-ometer according to SAE J1885 for 315 Kj/sq.m.

DETAILED DESCRIPTION OF THE PREFERRED EXEMPLARY EMBODIMENTS

A preferred class of polymers intended to be utilized in accordance with this invention are copolyester elastomers, for example, copolyetheresters. The copolyester elastomers usable in the practice of the present invention consist essentially of a multiplicity of recurring intralinear long chain and short chain ester units connected head-to-tail through ester linkages. The long chain ester units are represented by at least one of the following structures:

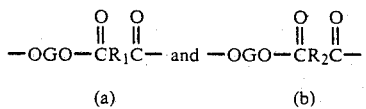

whereas the short chain ester units are represented by at least one of the following structures:

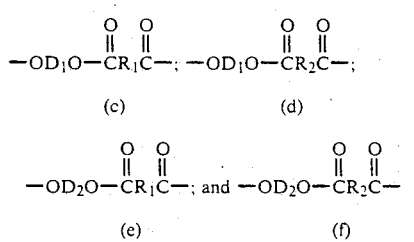

where
(i) G is a divalent radical remaining after removal of terminal hydroxyl groups from a long chain polymeric glycol, that is having a molecular weight about 600 and a melting point below about 55° C.;

(ii) $R_1$ and $R_2$ are different divalent radicals remaining after removal of carboxyl groups from different dicarboxylic acids each having a molecular weight less than about 300; and (iii) $D_1$ and $D_2$ are different divalent radicals remaining after removal of hydroxyl groups from different low molecular weight diols, that is having a molecular weight less than about 250.

The short chain ester units in the copolyetherester provide about 25 to 95% of the weight of the ccopolyetherester, and about 50 to 100% of the short chain ester units in the copolyetherester are identical.

The term "long chain ester units" as applied to units in a polymer chain, refers to the reaction product of a long chain glycol with a dicarboxylic acid. Such "long chain ester units", which are a repeating unit in the copolyester elastomers, correspond to the Formulas (a) or (b) above. The long chain glycols are polymeric glycols having terminal (or nearly terminal as possible) hydroxy groups and a molecular weight above about 600 and preferably from about 600-6000. The long chain glycols used to prepare the copolyesters of this invention are generally poly(alkylene oxide) glycols or glycol esters of poly(alkylene oxide) dicarboxylic acids. The chemical structure of the long chain polymeric part of the long chain glycol is not critical and any substituent groups can be present which do not interfere with polymerization of the compound with glycol(s) or dicarboxylic acid(s), as the case may be, to form the polymers of this invention. Thus, the chain can be a single divalent acrylic, alicyclic, or aromatic hydrocarbon group, poly(alkylene oxide) group, polyester group, a combination thereof, or the like which meets the other requirements set forth herein and any of these can contain substituents which do not interfere to a substantial extent with polymerization to form the copolyester elastomers usable in the compositions of this invention. The hydroxy functional groups of the long chain glycols which react to form the copolyesters should be terminal groups to the extent possible.

The term "short chain ester units" as applied to units in a polymer chain refers to low molecular weight compounds or polymer chain units having molecular weights less than about 550. They are made by reacting a low molecular weight diol (below about 250) with a dicarboxylic acid to form a repeating unit corresponding to the Formulas c, d, e, or f above.

The term "dicarboxylic acid" as used herein is intended to include the condensation polymerization equivalents of dicarboxylic acids, that is, their esters or ester-forming derivatives such as acid chlorides and anhydrides, or other derivatives which behave substantially like dicarboxylic acids in a polymerization reaction with a glycol.

The copolyesters useable in the compositions of this invention are prepared by polymerizing with each other (a) one or more dicarboxylic acids or their equivalents (and esters or ester-forming derivatives such as acid chlorides, anhydrides, etc.), (b) one or more linear long chain glycols, and (c) one or more low molecular weight diols. The polymerization reaction can be effected by conventional procedures, as for example, in bulk or in a solvent medium which dissolves one or more of the monomers.

The dicarboxylic acid monomers useful herein have a molecular weight less than about 300. They can be aromatic, aliphatic or cycloaliphatic. The dicarboxylic acids can contain any substituent groups or combination thereof which do not interfere with the polymerization reaction. Representative dicarboxlic acids include terephthalic and isophthalic acids, bibenzoic acid, substituted dicarboxy compounds with benzene nuclei such as bis(p-carboxyphenyl) methane, p-oxy-(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid, etc. and $C_1$–$C_{10}$ alkyl and other ring substitution derivatives thereof such as halo, alkoxy or aryl derivatives. Hydroxy acids such as p($\beta$-hydroxyethoxy) benzoic acid can also be used providing an aromatic dicarboxylic acid is also present.

"Aromatic dicarboxylic acids" are dicarboxylic acids in which each carboxy group is attached to a carbon atom in an isolated or fused benzene ring such as those mentioned above. "Aliphatic dicarboxylic acids" are acids in which each carboxy group is attached to a fully saturated carbon atom or to a carbon atom which is part of an olefinic double bond. If the carbon atom is in a ring, the acid is cycloaliphatic, and if not, the acid is aliphatic. Representative aliphatic and cycloaliphatic acids are sebacic acid, 1,3- or 1,4-cyclohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethylsuccinic acid, cyclopentanedicarboxylic acid, decahydro-1,5- (or 2,6-) naphthylene dicarboxylic acid, 4,4'-bicyclohexyl dicarboxylic acid, 4,4'-methylenebis(cyclohexyl carboxylic acid), 3,4-furan dicarboxylate, and 1,1-cyclobutane dicarboxylate. The preferred aliphatic acids, are the cyclohexanedicarboxylic acids and adipic acid.

It is important that the dicarboxylic acid have a molecular weight less than about 300 and aromatic acids with 8-16 carbon atoms are preferred. Particularly preferred are the phenylene dicarboxylic acids such as terephthalic and isophthalic acid. The acid molecular weight requirement pertains to the acid itself and not to its ester or ester-forming derivative. Thus, the ester of a dicarboxylic acid having a molecular weight greater than 300 is included in this invention provided the acid has a molecular weight below about 300.

Included among the low molecular weight (less than about 250) diols which react to form short chain ester units of the copolyesters are acyclic, alicyclic and aromatic dihydroxy compounds. Preferred are diols with 2-15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Especially preferred are aliphatic diols containing 2-8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivates; provided however, that the molecular weight requirement pertains to the diol only and not to its derivatives.

The long chain glycols have a molecular weight of about 600-6000, a melting point less than about 55° C. and the carbon to oxygen ratio in the long chain glycol being about 2.0 or greater. Long chain glycols which can be used in preparing the polymers useable in the compositions of this invention include the poly(alkylene oxide) glycols such as polyethylene glycol, poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly(1,2-butylene oxide) glycol; random or block copolymers of ethylene oxide and 1,2-propylene oxide and poly-formals prepared by reacting formaldehyde with glycols, such as pentamethylene glycol, or mixtures of glycols, such as a mixture of tetramethylene and pentamethylene glycols.

In addition, the dicarboxymethyl acids of poly(alkylene oxides) such as the one derived from polytetramethylene oxide

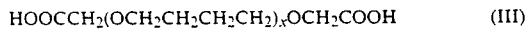

$$HOOCCH_2(OCH_2CH_2CH_2CH_2)_xOCH_2COOH \quad (III)$$

can be used to form long chain glycols in situ, as discussed below. Polythioether glycols and polyester glycols also provide useful products. In using polyester glycols care must generally be exercised to control a tendency to interchange during melt polymerization, but certain sterically hindered polyesters, e.g., poly(2,2-dimethyl-1,3-propylene adipate), poly(2,2-dimethyl-1,3-propylene/2-methyl-2-ethyl-1,3-propylene 2,5-dimethylterephthalate), poly(2,2-dimethyl-1,3-propylene/2,2-diethyl-1,3-propylene, 1,4-cyclohexanedicarboxylate) and poly(1,2-cyclohexylenedimethylene/2,2-dimethyl-1,3-propylene 1,4-cyclohexanedicarboxylate) can be utilized under normal reaction conditions and other more reactive polyester glycols can be used if a short residence time is employed. Either polybutadiene or polyisoprene glycols, copolymers of these and saturated hydrogenation products of these materials are also satisfactory long chain polymeric glycols. In addition, the glycol esters of dicarboxylic acids formed by oxidation of polyisobutylene diene copolymers are useful raw materials.

Although the long chain dicarboxylic acids (III) above can be added to the polymerization reaction mixture as acids, they react with the low molecular weight diol(s) present, these always being in excess, to form the corresponding poly(alkylene oxide) ester glycols which then polymerize to form the G units in the polymer chain, these particular G units having the structure

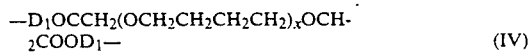

$$-D_1OCCH_2(OCH_2CH_2CH_2CH_2)_xOCH_2COOD_1- \quad (IV)$$

when only one low molecular weight diol (corresponding to $D_1$) is employed. When more than one diol is used, there can be a different diol cap (e.g., $D_1$ and $D_2$) at each end of the polymer chain unit. Such dicarboxylic acids may also react with long chain glycols if they are present, in which case a material is obtained having a formula the same as IV above except the D's are replaced with polymeric residues of the long chain glycols. The extent to which this reaction occurs is quite small, however, since the low molecular weight diol is present in considerable molar excess.

In producing the copolyesters which may be used in the compositions of this invention, a single long chain glycol or a mixture of them can be used. In the latter case there will be more than one G unit in the polymer chain (e.g., $G_1$, $G_2$, etc.) and the number of different long chain units will be proportionately increased. In any event the long chain glycol(s) react with a mixture of at least one low molecular weight diol and at least one dicarboxylic acid to form a thermoplastic polyester in which long and short chain ester units are connected head-to-tail through ester linkages, the long chain ester units being represented by one or more of the structures indicated by (I) above. The low molecular weight diols in the mixture react with one or more dicarboxylic acids to form short chain ester units in the thermoplastic polyester elastomer, these ester units being represented by at least one of the structures in group (II) above.

In place of a single low molecular weight diol, a mixture of such diols can be used. In place of a single long chain glycol or equivalent, a mixture of such compounds can be utilized, and in place of a single low molecular weight dicarboxylic acid or its equivalent, a mixture of two or more can be used in preparing the thermoplastic copolyester elastomers which can be employed in the compositions of this invention. Thus, the letter "G" in Formula I above can represent the residue of a single long chain glycol or the residue of several different glycols, and the letters $D_1$ and $D_2$ in Formula II can represent the residues of one or several low molecular weight diols. When an aliphatic acid is used which contains a mixture of geometric isomers, such as the cis-trans isomers of cyclohexane dicarboxylic acid, the different isomers should be considered as different compounds forming different short chain ester units with the same diol in the copolyesters.

Short chain ester units of Formula II must contribute 25-95% of the weight of the copolyester, with 50-100% of the total short chain ester units being identical—that is, be the reaction product of a single low molecular weight dicarboxylic acid with a single low molecular weight diol. They will normally be distributed statistically throughout the polymer backbone.

The copolyester elastomers can be made by conventional ester interchange reaction. A preferred procedure involves heating the dimethyl ester of terephthalic acid or a mixture of terephthalic and isophthalic acids with a long chain glycol and a molar excess of at least one of butanediol and butenediol in the presence of a catalyst at 50°-260° C. followed by distilling off of methanol formed by the interchange. Heating is continued until methanol evolution is complete. Depending upon temperature, catalyst and glycol excess, the polymerization is complete within a few minutes to a few hours. This procedure results in the preparation of a low molecular weight pre-polymer which can be carried to a high molecular weight copolyester by distillation of the excess of short chain diol in a conventional polycondesation reaction. Additional ester interchange occurs during this distillation to increase the molecular weight and to randomize the arrangement of the copolyester units. Best results are usually obtained if this final distillation or polycondensation is run at less than 1 mm. pressure and 225°-260° C. for less than 2 hours in the presence of antioxidants such as sym-di-beta-naphthyl-p-phenylenediamine and 1,3,5-trimethyl-2,4-tris (3,5-ditertiary-butyl-4-hydroxybenzyl)benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl or tetraisopropyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Prepolymers can also be prepared by a number of alternate esterification or ester interchange processes. For example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long chain glycol.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Another class of polyesters which may be useful to form the polyester molding compositions of this invention are linear and cyclic polyalkylene terephthalates, particularly polyethylene terephthalate (PET), polypropylene terephthalate (PPT), polybutylene terephthalate (PBT), and ethylene-1,4-cyclohexylene-dimethylene terephthalate (PETG). Of these, polybutylene terephthalate (PBT) is especially preferred. The polyalkylene terephthalate used may be a single polyalkylene terephthalate or a blend of suitable polyalkylene terephthalates. In addition, the polyalkylene terephthalate may be blended with the copolyester elastomer as above described so as to achieve the desired properties for a particular end-use application.

A variety of impact modifiers may also be blended with the polyester base resin to achieve a desired amount of impact resistance. Preferred for the compositions of the present invention are the core-shell graft copolymers described in greater detail in U.S. Pat. No. 3,864,428 (the entire content thereof being expressly incorporated hereinto by reference). Generally, these preferred impact modifiers are butadiene-type core-shell graft copolymers formed between a butadiene polymer core whose butadiene units account for at least 50 mole % of the total polymer and at least one cross-linked vinyl monomer such as a derivative of acrylic or methacrylic acid. In preferred embodiments more than one vinyl monomer is grafted to the butadiene rubber, for example a preferred copolymer is a three-stage polymer having a butadiene based rubbery core, a second-stage polymerized from styrene, and a cross-linked final stage (or shell) polymerized from methylmethacrylate and 1,3-butylene glycol dimethacrylate. Particular butadiene type core-shell impact modifiers which may be employed in the compositions of this invention include those commercially available from Rohm and Haas Company under the trade name Paraloid KM-653 and from M & T Chemicals under the designation Metablen C-223.

Another class of modifiers useful in the compositions of this invention are so-called acrylic impact modifiers (i.e., multiphase polymers). These multiphase polymers typically include from about 25 to about 95 weight percent of a first elastomeric phase and about 75 to 5 weight percent of a final rigid thermoplastic phase. One or more intermediate phases are optional, for example a middle stage polymerized from about 75 to 100 percent by weight styrene. The first stage is polymerized from about 75 to 99.8 weight percent $C_1$ and $C_6$ acrylate resulting in an acrylic rubber core having a glass transition temperature below about 10° C. and crosslinked with 0.1 to 5 weight percent crosslinking monomer and further containing 0.1 to 5 percent by weight graftlinking monomer.

The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is polyethylenically unsaturated monomer having a plurality of addition polymerizable reactive groups, at least one of which polymerizing at a substantially different rate of polymerization from at least one other of said reactive groups.

The function of the graftlinking monomer is to provide a residual level of unsaturation in the elastomeric phase, particularly in the latter stages of polymerization and, consequently, at or near the surface of the elastomer particles. When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer.

Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 percent by weight butyl acrylate 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate.

The final state monomer system can be comprised of $C_1$ to $C_{16}$ methacrylate, styrene, acrylonitrile, alkyl acrylates, allyl methacrylate, diallyl methacrylate, and the like, as long as the overall glass transition temperature is at least about 20° C. Preferably the final stage monomer system is at least about 50 weight percent $C_1$ to $C_4$ alkyl methacrylate. It is further preferred that the final stage polymer be free of units which tend to degrade poly(alkylene terephthalates), for example acid, hydroxyl, amino, and amide groups.

For further descriptions and examples of various multiphase polymers suitable for use in the present invention, references may be had to U.S. Pat. Nos. 4,096,202 and 4,034,013, the disclosures of which are incorporated herein by reference.

The polyester molding compositions of this invention necessarily include a triazine-based antioxidant in an amount (based upon the total weight of the composition) of between about 0.5 to about 3.5 weight percent. The triazine-based antioxidants which may be used are of the general formula:

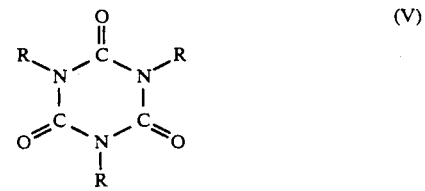

where each R is a phenolic group attached to the triazine ring via a C1 to C5 alkyl or an ester substituent. Preferably, each R is one selected from the group consisting of:

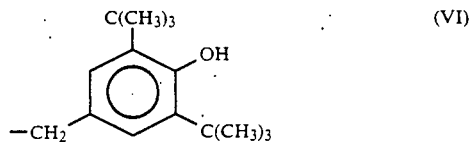

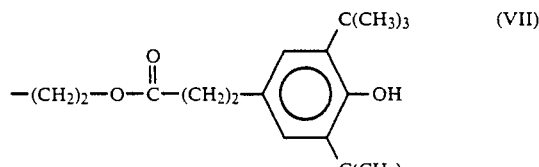

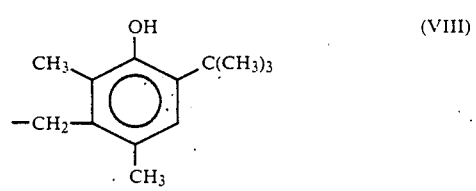

The triazine-based antioxidants which may be successfully employed in the present invention are commercially available. For example, a triazine-based antioxidant, where each R in Formula V is represented by the Formula VI is commercially available from Ciba-Geigy under the tradename Irganox 3114. Similarly, a triazine-based antioxidant, where each R in Formula V is represented by the Formula VIII is commercially available from American Cyanamid under the tradename Cyanoxe ® 1790.

However, particularly preferred for the compositions of this invention is the triazine-based antioxidant where each R in the Formula V is represented by the Formula VII—that is, 3,5-di-tert-butyl-4-hydroxyhydrocinnamic acid triester with 1,3,5-tris(2-hydroxethyl)-s-triazine-2,4,6(1H, 3H, 5H)-trione. Such a compound is commercially available from Ciba Geigy under the tradename Irganox 3125.

The compositions of the present invention also necessarily include a benzophenone UV-absorber of the general formula:

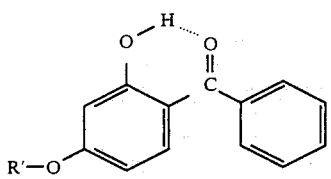

where R' is hydrogen or an alkyl radical of 1 to 8 carbon atoms.

The benzophenone UV-absorbers are also commercially available from American Cyanamid under the tradename Cyasorbe ® UV531 (i.e., a benzophenone UV-absorber of Formula IX where R' is $C_8H_{17}$) and BASF Wyandotte Corporation under the tradename Uvinul 400 (i.e., a benzophenone UV-absorber of Formula IX where R' is hydrogen).

Blends of the present invention may include approximately 1 to 50 percent by weight (based upon the total weight of the composition) of filler materials. Representative filler materials include calcium silicate, silica, clays, talc, mica, polytetrafluoroethylene, graphite, alumina, trihydrate, socium aluminum carbonate, barium ferrite, pigments, etcetera.

Approximately 1 to 60 weight percent, and preferably 50 to 60 weight percent (based upon the total weight of the composition) of reinforcing agents may also be blended with the compositions of this invention. Specific examples of such reinforcing materials include glass fibers, graphitic carbon fibers, amorphous carbon fibers, synthetic polymeric fibers, aluminum fibers, titanium fibers, steel fibers, tungsten fibers, and ceramic fibers, to name just a few.

The additives may be mixed with the polyester base polymer in any expedient fashion. For example, the additives and polyester base polymer may be mixed by dry-blending in a Henschel mixer followed by melt extrusion and pelletizing; by milling between two heated rolls and chopping into molding granules; or by milling in Banbury mixer or Brabender Plastograph.

The invention will be further illustrated by way of the following Examples, which are to be considered to be illustrative only, and non-limiting.

EXAMPLES

Polyester base resins were preblended with photostabilizers according to the formulations presented in the following Tables. The dry blend was extruded on a single-screw extruder at 200° C. and 100 RPM, and pelletized. The pelletized samples were then injection molded into test plaques on a reciprocating screw machine at 200° C. for those samples not containing polybutylene terephthalate in the base resin, and at 240° C. for those samples which included polybutylene terephthalate blended in the base resin.

Test plaques of the compositions were exposed to ultraviolet light and heat in a Xenon arc weatherometer, operated according to automotive test procedure SAE J1885. The primary conditions of the test are as follows:

|  | Light Cycle | Dark Cycle |
| --- | --- | --- |
| Irradiance, W/m² | 0.55 | — |
| Black Panel Temp., °C. | 89 | 38 |
| Relative Humidity, % | 50 | 100 |
| Cycle Time, hr. | 3.8 | 1.0 |

The Xenon arc weatherometer is of the water-cooled, controlled irradiance type. Amount of exposure is measured in terms of the total irradiation the test plaques receive, expressed in kilojoules per square meter. The degree of color change is determined by instrumentally measuring the color of exposed specimens versus the unexposed specimens. The degree of color change is quantified as the total color difference (Delta E), calculated for illuminant "D-65", 10-degree observer, expressed in CIELab units, in accordance with ASTM D-2244. Samples are measured at various increments of irradiation accumulated by the test plaques.

In the Examples presented herein, the following terms have the meanings given below:

PBT—polybutylene terephthalate

Riteflexe ®—copolyetherester resin commercially available from Hoechst Celanese Corporation Hytrele ®—copolyetherester resin commercially available from E.I.DuPont Irganox 1010—trade name for the phenolic antioxidant tetrakis (methylene-3-(3,5-di-tert-butyl-4-hydroxyphenyl propionate) methane, commercially available from Ciba-Geigy Irganox 3125—trade name for the triazine-based antioxidant 3,5-di-tert-butyl-4-hydroxyhydrocinnamic acid triester with 1,3,5-tris (2-hydroxyethyl-s- triazine-2,4,6 (1H, 3H, 5H)-trione commercially available from Ciba Geigy Tinuvin 234—trade name for the benzotriazole UV-absorber 2-(3',5'-bis(1-methyl-1-phenylethyl)-2'-hydroxyphenyl)benzotriazole commercially available from Ciba-Geigy Tinuvin 770—trade name for the hindered piperidine type photostabilizer bis(2,2,6,6-tetramethyl-4-piperidinyl)sebacate commercially available from Ciba-Geigy Cyasorbe ® UV531—trade name for the benzophenone UV-absorber 2-hydroxy-4-n-octoxy-benzophenone commercially available from American Cyanamid Naugarde ® 445—trade name for the amine antioxidant (substituted diphenylamine) commercially available for Uniroyal Irgafos 168—trade name for the phenolic antioxidant tris(2,4-di-tert-butylphenyl)phosphite commercially available from Ciba-Geigy Univul 400—trade name for benzophenone UV-absorber 2,4-dihydroxybenzophenone commercially available from BASF Wyandotte Corporation.

EXAMPLE I

Test plaques of the compositions identified in Table I below were prepared as described above and were subjected to a Xenon arc weather-ometer in which the samples were exposed to UV radiation at a temperature of 89° C. thereby combining the effects of heat and light degradation. Delta E is the measure of color change at the exposure levels indicated versus the unexposed samples, while Delta E' is the color change of the exposed sample at 315 Kj/sq.m versus the color change of the exposed sample at 25 Kj/sq.m. The results appear in Table 1.

TABLE I

|  | Control A | Control B | Control C | Control D | Sample 1 |
|---|---|---|---|---|---|
| Hytrel 3548 | 100 | — | — | — | — |
| Hytrel 5556 | — | 99.25 | — | — | — |
| Riteflex 555(1) | — | — | 100 | 99.25 | 99.25 |
| Irganox 1010 | — | 0.25 | — | 0.25 | — |
| Tinuvin 234 | — | 0.25 | — | 0.25 | — |
| Tinuvin 770 | — | 0.25 | — | 0.25 | — |
| Cyasorb UV531 | — | — | — | — | 0.75 |
| Delta E @ 25Kj/sq.m | 14.8 | 3.5 | 13.1 | 5.6 | 3.1 |
| Delta E @ 315Kj/sq.m | 11.8 | 13.4 | 22.2 | 14.5 | 8.6 |
| Delta E' (315 vs. 25Kj) | 7.4 | 10.8 | 9.1 | 9.2 | 5.6 |
| Surface appearance | severe erosion | smooth | smooth | smooth | smooth |

(1) contains 1.75% Irganox 3125

In table I it can be seen that Sample 1 according to this invention exhibits the least color change and is superior to the color changes exhibited by the Control Samples A-D. In this regard, Control Samples A and B are typical of copolyetherester compositions which are presently commercially available for end-use applications requiring UV light stability.

A comparison of Sample 1 according to this invention to Control Samples A and B demonstrates that the combination of the triazine-based antioxidant (Irganox 3125) and the benzophenone UV-absorber (Cyasorb ® UV531) produced much better results than the limited improvement of resistance to heat and light that would have been expected from the teaching of U.S. Pat. No. 4,185,003. Note also the severe surface erosion of the commercially available UV-stabilized polyetherester composition of Control Sample A.

In addition, a comparison of Sample 1 according to this invention and Control Samples B and D demonstrate the superior results which may be achieved using the triazine-based antioxidant and benzophenone UV-absorber over the known antioxidant (Irganox 1010)/UV-absorber (Tinuvin 234)/hindered piperidine (Tinuvin 770) type photostabilizer system. Thus, the compositions of the present invention which do not include the hindered piperidine type photostabilizer would have been expected to exhibit eroded surfaces, evidenced by surface cracks and/or crazes, etcetera based upon the recognition in the art that piperdine type photostabilizers (Tinuvin 770) are indispensible for good surface protection of copolyetheresters (Hytrel ®). In this regard, see DuPont Hytrel ® Technical Notes on "Weathering Protection for Hytrele Polyester Elastomer", Mar. 2, 1977. The composition of the present invention (i.e., Sample 1) showed no eroded surfaces.

EXAMPLE II

In Table 2 below, Sample No. 1 according to the present invention demonstrates the effectiveness of the triazine-based antioxidant (Irganox ® 3125)/benzophenone (Cyasorbe ® UV531) as compared to employing the triazine-based antioxidant alone (Irganox 3125, Control Sample C); an amine antioxidant alone (Naugard ® 445, Control Sample E); and the combination (Control Sample F) of an amine antioxidant (Naugard ® 445) and a benzophenone UV-absorber (Cyasorb ® UV531).

TABLE II

|  | Control C | Control E | Sample 1 | Control F |
|---|---|---|---|---|
| Riteflex 555(1) | 100 | — | 99.25 | — |
| Riteflex 555ZS(2) | — | 100 | — | 99.25 |
| Cyasorb UV531 | — | — | 0.75 | 0.75 |
| Delta E @ 25Kj/sq.m | 13.1 | 21.7 | 3.1 | 17.9 |
| Delta E @ 315Kj/sq.m | 22.2 | 33.4 | 8.6 | 32.5 |
| Delta E' (315 vs. 25Kj) | 9.1 | 12.0 | 5.6 | 15.6 |

(1) contains 1.75% Irganox 3125
(2) contains 1.75% Naugard 445

Control Sample F demonstrates the expected limited improvement in the resistance to heat and light degradation imparted to copolyester elastomers via an antioxidant and a benzophenone. Unexpectedly however, Sample No. 1 according to this invention shows significantly superior results in terms of its resistance to heat and light degradation as compared to Control Sample F, and as compared to Control Samples C and E. The data in Table 2 therefore demonstrates the initial, rapid color change (0 to 25 Kj/sq.m) and the rate of color change thereafter (Delta E') are greatly reduced using the stabilizing system of the present invention—i.e., a triazine-based antioxidant and a benzophenone UV-absorber.

EXAMPLE III p The data in Table 3 below demonstrate that the triazine-based antioxidant and benzophenone UV-absorber are effective in blends of PBT and copolyester elastomers.

TABLE III

|  | Control C | Control G | Sample 1 | Sample 2 | Control H | Control I |
|---|---|---|---|---|---|---|
| Riteflex 555(1) | 100 | 70 | 99.25 | 69.50 | 99.25 | 69.50 |
| PBT-.70IV(2) | — | 30 | — | 29.75 | — | 29.75 |
| Cyasorb UV531 | — | — | 0.75 | 0.75 | — | — |
| Tinuvin 234 | — | — | — | — | 0.75 | 0.75 |
| Delta E @ 25Kj/sq.m | 13.1 | 11.4 | 3.1 | 2.5 | 3.0 | 2.8 |
| Delta E @ 315Kj/sq.m | 22.2 | 26.9 | 8.6 | 9.7 | 10.3 | 13.2 |
| Delta E' (315 vs. 25Kj) | 9.1 | 15.8 | 5.6 | 7.7 | 7.3 | 10.5 |

(1) contains 1.75% Irganox 3125
(2) blends containing PBT also contain 0.1% Irganox 1010 and 0.2% Irgafos 168 as stabilizers during the compounding process A comparison of Sample 1 and Control H shows that the triazine-based antioxidant and benzophenone stabilizing system is superior to a system employing a triazine-based antioxidant and a benzotriazole (Tinuvin 234) Furthermore, a comparison of Sample 2 to Control I shows that the use of benzophenone results in an improvement relative to benzotriazole in the PBT/copolyester elastomer blend at 315 Kj/sq.m. This result is unexpected since it is recognized that benzotriazoles are more efficient and effective UV-absorbers than benzophenones at equal concentrations. In this regard, see Plastics Additives Technical Bulletin D-48, American Cyanamid Company (August, 1985), and Encyclopedia of Polymer Science and Technology, Volume 14, page 132 (1971).

EXAMPLE IV

The data in Table 4 below demonstrate the effectiveness of the triazine-based antioxidant and benzophenone UV-absorber stabilizing system according to this invention at various concentration levels of the latter. In addition, one sample (Sample 9) demonstrates that other additives may be employed in the compositions of this invention without adversely affecting the heat and light stability properties that are achieved.

TABLE IV

|  | Control G | Sample 5 | Sample 6 | Sample 7 | Sample 8 | Sample 9 |
|---|---|---|---|---|---|---|
| Riteflex 555(1) | 70 | 69.65 | 69.50 | 68.95 | 69.50 | 69.34 |
| PBT-.70IV(2) | 30 | 29.85 | 29.75 | 29.55 | 29.75 | 29.67 |
| Cyasorb UV531 | — | 0.50 | 0.75 | 1.50 | — | 0.75 |
| Uvinul 400 | — | — | — | — | 0.75 | — |
| Tinuvin 770 | — | — | — | — | — | 0.35 |
| Delta E @ 25Kj/sq.m | 11.4 | 3.1 | 2.5 | 1.5 | 0.4 | 1.9 |
| Delta E @ 315Kj/sq.m | 26.9 | 12.3 | 9.7 | 6.7 | 2.0 | 7.8 |
| Delta E' (315 vs. 25Kj) | 15.8 | 9.3 | 7.3 | 5.4 | 2.1 | 6.2 |

(1)contains 1.75% Irganox 3125
(2)blends containing PBT also contain 0.1% Irganox 1010 and 0.2% Irgafos 168 as stabilizers during the compounding process The Examples above clearly demonstrate that the compositions according to the present invention exhibit effective UV-light stability due to the synergy of the triazine-based antioxidant and the benzophenone UV-absorber. Thus, while the invention has been described in connection with what is presently considered to be the most practical and preferred embodiments, it is to be understood that the invention is not to be limited to the disclosed embodiments, but on the contrary, is intended to cover various modifications and equivalent compositions included within the spirit and scope of the appended claims.

What is claimed is:

1. A composition exhibiting stability against the degradative effects of ultraviolet light comprised of, based upon the total weight of the composition:
   (a) a copolyetherester consisting essentially of a multiplicity of recurring intralinear long chain and short chain ester units connected head-to-tail through ester linkages, said long chain ester units being represented by at least one of the following structures:

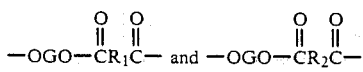

and said short chain ester units are represented by at least one of the following structures:

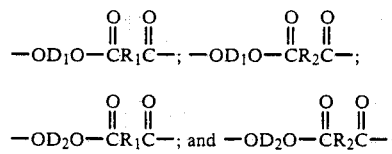

where
(i) G is a divalent radical remaining after removal of terminal hydroxyl groups from a long chain polymeric glycol having a molecular weight about about 600 and a melting point below about 55° C.;
(ii) R$_1$ and R$_2$ are different divalent radicals remaining after removal of carboxyl groups from different dicarboxylic acids each having a molecular weight less than about 300; and
(iii) D$_1$ and D$_2$ are different divalent radicals remaining after removal of hydroxyl groups from different low molecular weight diols having a molecular weight less than about 250;
wherein said short chain ester units in the copolyetherester providing about 25 to 95% of the weight of said copolyetherester, and about 50 to 100% of said short chain ester units in said copolyetherester are identical;
(b) between about 0.5 to about 3.5 percent of a triazine-based antioxidant of the formula:

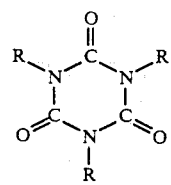

wherein each R is a phenolic group attached to the triazine ring via a C1 to C5 alkyl or an ester substituent; and
(c) between about 0.2 to about 3.5 percent of a benzophenone ultraviolet light absorber of the formula:

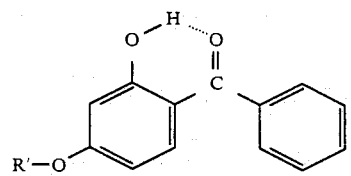

where R' is hydrogen or an alkyl radical, and wherein said composition exhibits a color difference, as calculated in CIELab units under illuminant "D-65" according to ASTM Standard D-2244, of less than about 10.0, when exposed in a Xenon arc weatherometer operated according to SAE J1885 for 315 Kj/m².

2. A composition as in claim 1, wherein each said R of said triazine-based antioxidant is selected from the group consisting of:

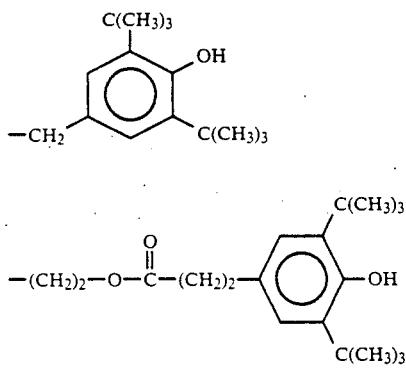

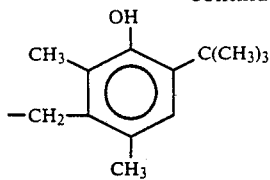

3. The composition as in claim 1, which further includes a linear polyalkylene terephthalate blended with said copolyester.

4. The composition as in claim 3 wherein said linear polyalkylene terephthalate is a linear polybutylene terephthalate.

5. The composition as in claim 1 or 3, which further comprises an impact modifier.

6. The composition as in claim 5, wherein said impact modifier is a butadiene polymer core-shell polymer formed between a butadiene polymer core whose butadiene units account for at least 50 mole % of the total polymer and at least one crosslinked vinyl monomer selected from the group consisting of acrylic acid and methacrylic acid.

7. A composition as in claim 6, wherein said impact modifier is a multiphase polymer including between about 25 to about 95 weight percent of a first elastomeric phase and about 75 to about 5 weight percent of a second rigid thermoplastic phase.

* * * * *

UNITED STATES PATENT AND TRADEMARK OFFICE
CERTIFICATE OF CORRECTION

PATENT NO. : 5,032,631

DATED : July 16, 1991

INVENTOR(S) : GOLDER et al

It is certified that error appears in the above-identified patent and that said Letters Patent is hereby corrected as shown below:

Column 12, line 22, change "Riteflexe" to --Riteflex--;
           line 24, change "Hytrele" to --Hytrel--;
           line 43, change "Cyasorbe" to --Cyasorb--.

Signed and Sealed this

Twenty-second Day of December, 1992

*Attest:*

DOUGLAS B. COMER

*Attesting Officer*      *Acting Commissioner of Patents and Trademarks*